United States Patent [19]

Croker

[11] Patent Number: 5,427,610

[45] Date of Patent: Jun. 27, 1995

[54] PHOTORESIST SOLVENT FUME EXHAUST SCRUBBER

[75] Inventor: Michael G. Croker, Rocklin, Calif.

[73] Assignee: NEC Electronics, Inc., Mountain View, Calif.

[21] Appl. No.: 250,229

[22] Filed: May 27, 1994

[51] Int. Cl.$^6$ ............................................. B01D 53/04
[52] U.S. Cl. ........................................ 95/114; 95/143; 95/272; 95/288; 96/135; 96/139; 96/140; 96/142; 55/269; 55/308; 55/319; 55/322; 55/325; 55/444
[58] Field of Search ................. 95/39, 41, 114, 116, 95/141, 143, 267, 268, 272, 288; 96/134, 135, 138-140, 142; 55/269, 307, 308, 319-322, 325, 435, 436, 444, 519

[56] References Cited

U.S. PATENT DOCUMENTS

| | | | |
|---|---|---|---|
| 999,973 | 8/1911 | Farmer | 55/322 |
| 1,096,223 | 5/1914 | Cochran | 55/269 X |
| 1,096,224 | 5/1914 | Cochran | 55/269 X |
| 1,815,570 | 7/1931 | Jones | 55/269 X |
| 1,853,236 | 4/1932 | Shadle | 55/269 X |
| 1,946,744 | 2/1934 | Jones et al. | 55/308 |
| 2,997,131 | 8/1961 | Fisher | 55/308 X |
| 3,172,747 | 3/1965 | Nodolf | 96/138 X |
| 4,043,774 | 8/1977 | McGrath | 96/140 |
| 4,627,406 | 12/1986 | Namiki et al. | 55/322 X |
| 4,699,681 | 10/1987 | Kasmark, Jr. et al. | 96/134 X |
| 4,917,862 | 4/1990 | Kraw et al. | 96/134 X |
| 5,000,768 | 3/1991 | Hwang | 55/308 |
| 5,211,729 | 5/1993 | Sherman | 55/308 |
| 5,282,885 | 2/1994 | Cameron | 55/269 X |

FOREIGN PATENT DOCUMENTS 195184 1/1958 Austria ............................. 96/139

OTHER PUBLICATIONS

Exhibit I: Internal Memorandum which discusses the installation on Jan. 12, 1994 of exhaust scrubber of the present invention. Date: Approximately Jan. or Feb. 1994.

Exhibit II: Notebook page photocopy including a drawing of the prototype exhaust scrubber, which was installed on Dec. 26, 1989. Author: Michael Croker. Date: Nov. 10, 1989.

Exhibit III: Notebook page photocopy including a drawing of the prototype exhaust scrubber. A cooling coil, which was implemented in the exhaust scrubber approximately Jan. 1990, is added to the Nov. 10, 1989 drawing. Author: Michael Croker. Date: Aug. 25, 1994.

*Primary Examiner*—Robert Spitzer
*Attorney, Agent, or Firm*—Skjerven, Morrill, MacPherson, Franklin & Friel

[57] ABSTRACT

A solvent fume exhaust scrubber (100) for recovering organic vapor from exhaust air which is produced during the manufacture of semiconductors includes a throttling chamber (180) containing a plurality of planar baffles (112, 114, 116, 118 and 120), a planar condenser (130) and a cooling coil (138) which engages and substantially traverses the planar surface of the condenser. The throttling chamber intersects an exhaust duct (152) so that an exhaust stream (182) flows in a flow direction (184) through the chamber. Each baffle and condenser has a planar surface which is disposed at right angles to the flow direction. The surface extends partially across the exhaust stream. The baffles are arranged sequentially along the flow direction and have offsetting planar surfaces across the exhaust stream so that the baffles in combination extend across the exhaust stream. A baffle includes a baffle frame (302) for holding a plurality of carbon beads (306).

17 Claims, 5 Drawing Sheets

PHOTORESIST SOLVENT FUME EXHAUST SCRUBBER

BACKGROUND OF THE INVENTION

1. Field of the Invention

The present invention relates to an apparatus and method for capturing photoresist stripping chemicals from an exhaust system and, more particularly, to such an apparatus and method utilizing a combination of throttling, cooling and carbon adsorption.

2. Description of the Related Art

Various toxic chemicals, including solvents and organic compounds, are produced during semiconductor and integrated circuit manufacturing operations. The toxic organic compounds include carbon monoxide, carbonic acid, metallic carbides of carbonates and ammonium carbonate. For example, photoresist processing is a semiconductor manufacturing procedure that requires the use of strongly acidic solvents. Photoresist processing produces a solvent mist which is collected in the manufacturer's exhaust system. For some photoresist processing methods, the solvent released into the exhaust system is very close to its flash point, creating a dangerous condition and making the removal of the solvent difficult.

Furthermore, toxic solvents and organic compounds, including waste solvents, are injurious to the environment and their emission into the environment is regulated by various state and federal government agencies. For example, the amount of the compounds that are produced by a semiconductor manufacturer is limited. Furthermore, the compounds and solvents cannot be stored or discarded in a manner that allows evaporation of the materials into the atmosphere.

In addition, many of the toxic compounds and solvents are highly acidic organic vapors that, if allowed to enter the general exhaust system of a manufacturer, causes corrosion and leaking of the system ducts and fills the duct work with a soluble sludge.

Semiconductor manufacturers have used various methods to reduce emissions of organic materials, including incinerators, water scrubbers and adsorption systems.

SUMMARY OF THE INVENTION

What is sought is an improved system for safely recovering organic vapor from exhaust air which is produced during the manufacture of semiconductors, thereby reducing emissions of the vapor.

More particularly, what is sought is an improved system for capturing photo resist stripping chemicals and removing the chemicals from the exhaust system, thus eliminating leaks, duct damage and greatly reducing emissions into the atmosphere.

These and other advances are achieved in the present invention, which in one embodiment is a solvent fume exhaust scrubber including a throttling chamber containing a plurality of planar baffles, a planar filter and a cooling coil which engages and substantially traverses the planar surface of the filter. The throttling chamber is enclosed within a housing having inlet and outlet apertures. The throttling chamber intersects an exhaust duct so that an exhaust stream flows in a flow direction from the inlet to the outlet aperture. Each baffle and filter within the throttling chamber has a planar surface which is disposed at right angles to the flow direction. The surface extends partially across the exhaust stream. The baffles are arranged sequentially along the flow direction and have offsetting planar surfaces across the exhaust stream so that the baffles in combination extend across the exhaust stream. A baffle includes a baffle frame for holding a plurality of carbon beads.

A second embodiment of the invention is a method of processing an exhaust vapor stream in an exhaust duct to remove photoresist stripping chemicals including the steps of infusing the exhaust vapor stream from the exhaust duct into a throttling chamber, baffling the exhaust vapor stream within the throttling chamber to further reduce the exhaust vapor pressure and condensate the vapor, adsorbing the exhaust vapor on carbon beads contained within the cavity of the baffles, filtering the exhaust vapor and cooling the exhaust vapor to further promote condensation of the vapor.

BRIEF DESCRIPTION OF THE DRAWINGS

The present invention may be better understood and its advantages, objects and features made better apparent by making reference to the following description, taken in conjunction with the accompanying drawings, wherein.

DETAILED DESCRIPTION OF THE PREFERRED EMBODIMENT

Figure 1:
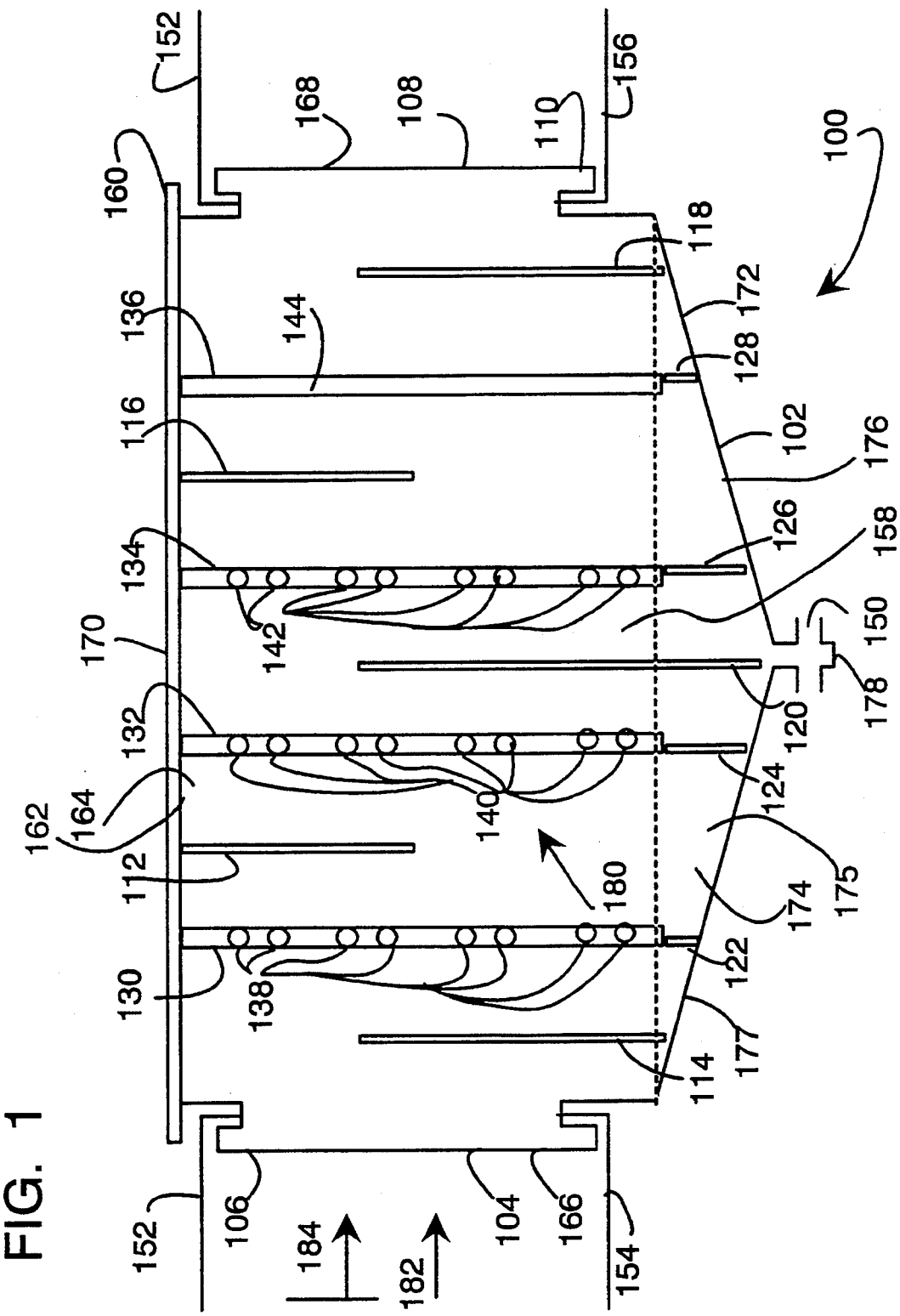
FIG. 1 illustrates a side plan view of a first embodiment solvent fume exhaust scrubber.

Referring to FIG. 1, there is shown a side plan view of a first embodiment of a solvent fume exhaust scrubber 100 in which a stainless steel housing 102 intersects an exhaust duct 152 carrying vapors from a photoresist stripper (not shown). The side surfaces 162 and 164, end surfaces 166 and 168 and top surface 170 of the housing 102 are stainless steel sheets which form a rectangular box 158 in which the top surface 170 includes a lid 160. The bottom surface 172 of the housing 102 includes four mutually adjoining stainless steel triangular sections 174, 175, 176 and 177. Triangular sections 174 and 175 adjoin the bottom edges of the side surfaces 162 and 164, respectively, and triangular sections 176 and 177 adjoin the bottom edges of the end surfaces 166 and 168, respectively, and extend downward to a central point 178 at which a drain valve 150 is attached. The housing 102 encloses a throttling chamber 180 which has a cross-sectional area that is larger than the cross-sectional area of the exhaust duct 152. The housing 102 is secured to the inflow exhaust duct 154 by a circular inlet aperture flange 106 that receives an exhaust stream 182 of gases through a circular inlet aperture 104 in the housing 102. The exhaust stream 182 flows in a flow direction 184 from the inflow exhaust duct 154 through the throttling chamber 180 to the outflow exhaust duct 156 through a circular outlet aperture 108. The housing 102 is secured to the outflow exhaust duct 156 by a circular outlet aperture flange 110.

Within the throttling chamber 180, the exhaust stream 182 flows through a series of baffles and condensers in a sequence from the inflow exhaust duct 154 to the outflow exhaust duct 156 including a lower inlet baffle 114, a condenser 130, an upper inlet baffle 112, a condenser 132, a lower central baffle 120, a condenser 134, an upper outlet baffle 116, a carbon bead baffle 136 and a lower outlet baffle 118. The baffles and condensers are planar and essentially rectangular in shape, having a planar surface disposed at right angles to the flow direction 184. The upper inlet baffle 112, the lower inlet baffle 114, the upper outlet baffle 116, the lower outlet baffle 118 and the lower central baffle 120 are secured to the housing 102 and constructed from stainless steel of thickness ranging from 0.125 to 2 inches, with a preferred thickness of approximately 0.25 inch. The carbon bead baffle 136, containing multiple carbon beads 144, is inserted into a channel (not shown) which secures the baffle inside the housing 102 against motion parallel to the flow direction 184. The condensers 130, 132, 134 and the carbon bead baffle 136 are respectively supported by condenser supports 122, 124, 126 and 128. The condenser supports 122, 124, 126 and 128 are welded in place in the channels (not shown) at the lower portion of the housing 102 and the respective condensers 130, 132 and 134 and carbon bead baffle 136 are inserted into the channels above the condenser supports to secure the condenser supports and condensers against motion parallel to the flow direction 184. The planar surfaces of the lower inlet baffle 114, the lower outlet baffle 118 and the lower central baffle 120 extend fully across the throttling chamber 180 horizontally from side surface 162 to side surface 164 but extend in the vertical direction from the bottom surface 172 of the chamber 180 only partially to the top surface 170, where they are welded into position. The planar surfaces of the upper inlet baffle 112 and the upper outlet baffle 116 extend completely across the throttling chamber 180 horizontally from side surface 162 to side surface 164 but extend in the vertical direction from the top surface 170 of the chamber only partially to the bottom surface 172, where they are welded in place. In this manner, the lower baffles 114, 120 and 118 are offset from the upper baffles 112 and 116 in the vertical direction so that substantially the entire cross-section of the exhaust stream 182 is deflected by the baffles. For example, the lower baffles 114, 118 and 120 may have sizes chosen so that only the lower half of the exhaust stream 182 is deflected and the upper baffles 112 and 116 may have sizes chosen so that only the upper half of the exhaust stream 182 is deflected.

A lid 160 forms the top surface 170 of the housing 102. The condensers 130, 132 and 134 and carbon bead baffle 136 are removable from the chambers by lifting the lid 160.

Tubular cooling coils 138, 140 and 142 are respectively interwoven through condensers 130, 132 and 134. Each cooling coil extends substantially across the condensers in a series of parallel horizontal sections which are connected by C-shaped joints.

The throttling chamber 180 acts as a condensation chamber to recover organic vapor from the exhaust gases produced by chemical treatment equipment used to manufacture semiconductors and integrated circuits. The throttling chamber 180 within the housing 102 has a cross-sectional area that is larger than the area of the exhaust duct 152 feeding the solvent fume exhaust scrubber 100 so that the pressure of the fluid is reduced as it passes from a smaller area to a larger one, thus condensing the liquid vapor. The baffles 112, 114, 116, 118 and 120 and condenser supports 122, 124, 126 and 128 deflect the movement of the exhaust stream flow 184 to cause a further pressure drop that intensifies condensation of the vapor. The condensers 130, 132 and 134 further condensation of the vapor by supplying a surface upon which the condensate collects. The cooling coils 138, 140 and 142 which are interwoven through the respective condensers 130, 132 and 134 cool the exhaust vapor to supply an additional condensation of organic material from the exhaust vapor.

Figure 2A:
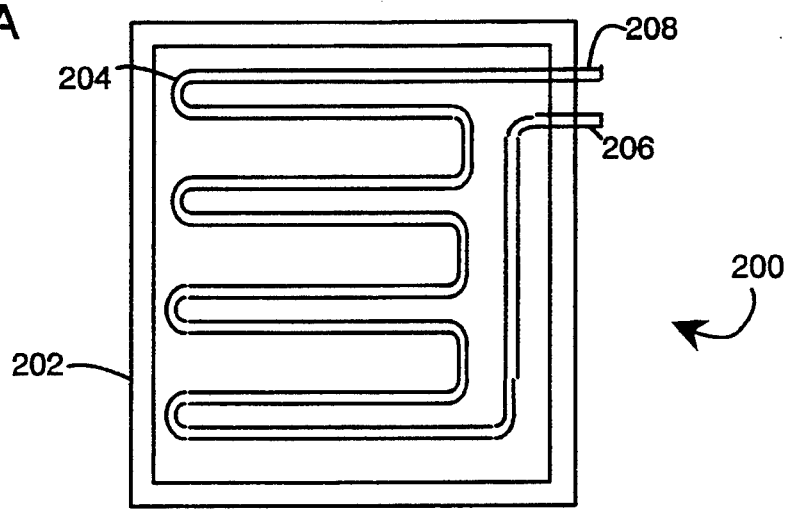
FIGS. 2A and 2B respectively depict an internal plan view and an external plan view of a condenser of the solvent fume exhaust scrubber shown in FIG. 1.
Figure 2B:
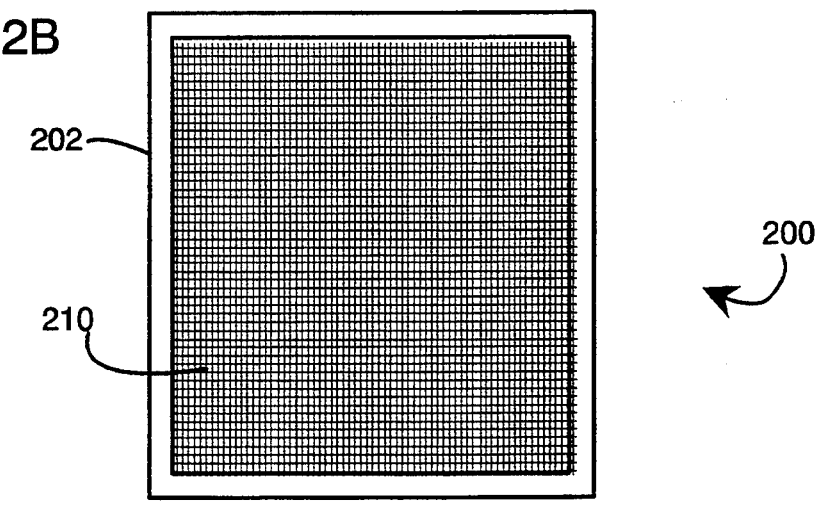

Referring to FIGS. 2A and 2B, there are respectively shown an internal plan view and an external plan view of a condenser 200 which corresponds to each of the condensers 130, 132 and 134 that are shown in FIG. 1. The condenser 200 is planar and rectangular in shape, having the planar surface disposed perpendicular to the flow direction 184. The condenser 200 includes a condenser frame 202 which supports a cooling coil 204 interwoven through the condenser 200 and extending substantially across the condenser in a series of parallel horizontal sections which are connected by C-shaped joints. The cooling coil 204 corresponds to the cooling coils 138, 140 and 142 shown in FIG. 1 The condenser frame 202 is constructed from four stainless steel 1.5" U-channels joined at welded miter joints. The cooling coil 204 has an inflow connector 206 for receiving the cooling fluid and an outflow connector 208 for discharging the cooling fluid. The cooling coils 138, 140 and 142 are each connected to a processed clean water source which supplies cool water having a temperature of approximately 65 degrees F. A wire screen 210 is constructed from a 0.25"×0.25" stainless steel wire mesh which is extended and welded to engage the condenser frame 202. The wire screen 210 furnishes a surface which collects exhaust vapor condensate. The cooling coil 204 contacts the wire screen 210 so that exhaust vapor condenses upon the wire screen 210. Heat is transferred from the exhaust vapor to the cooling coil 204 where it is radiated back into the cooling loop.

Figure 3:
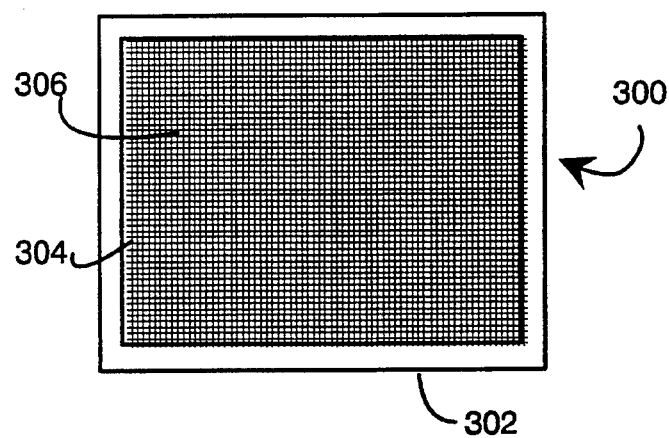
FIG. 3 illustrates an end plan view of a baffle within the solvent fume exhaust scrubber shown in FIG. 1.

Referring to FIG. 3, there is shown an end plan view of a carbon bead baffle 300 which corresponds to the carbon bead baffle 136 shown in FIG. 1. The baffle 300 is planar and rectangular in shape, having planar surfaces disposed perpendicular to the flow direction 184. The baffle 300 includes a baffle frame 302 for supporting an inflow wire mesh 304 and an outflow wire mesh (not shown). Carbon beads 306 are secured within the baffle frame 302 between the inflow wire mesh 304 and the outflow wire mesh. The baffle frame 302 is constructed from four stainless steel $\frac{3}{8}$" U-channels. Three of the four U-channels are joined at welded miter joints. The fourth U-channel is attached to the baffle frame 302 at miter joints which using screws which are removable to allow replacement of the carbon beads 306. The inflow wire mesh 304 and outflow wire mesh (not shown) are constructed from a $\frac{1}{8}$"×$\frac{1}{8}$" stainless steel wire mesh which are extended and welded to the three welded U-channel segments to engage respective inflow and outflow planar surfaces of the baffle frame 302. The carbon beads 306 are composed of activated charcoal having a size in the range from approximately 1 mm to approximately 25 mm in diameter with a preferred range of diameters from about 4 to 6 mm.

The carbon beads 306 collect photoresist stripper, saturating with the stripper so that the organic chemicals take the form of droplets, rather than a mist, which more easily condenses in the throttling chamber 180. The baffle 300 may be removed from the housing 102 for replacement of the carbon beads 306. Even when the beads are saturated, the baffle 300 furnishes a surface for collection of the condensate to accumulate the fluid without restricting exhaust flow.

The baffle 300 functions both to filter the exhaust vapor and to baffle the exhaust stream 182. The activated charcoal beads 306 within the baffle 300 20 filter the vapor, serving as an exhaust liquid trap for capturing photo resist stripping chemicals and reducing the entry of these chemicals into the exhaust system and environment, thus avoiding leaks and damage in the exhaust duct 152 and emissions to the atmosphere. Even when the beads are saturated with organic chemicals, the baffle 300 furnishes a surface to impinge on to better collect the liquid without restricting air flow. Furthermore, the baffle 300 deflects the movement of the exhaust stream flow 184, causing a pressure drop that assists condensation of the exhaust vapor onto the beads 306.

Figure 4:
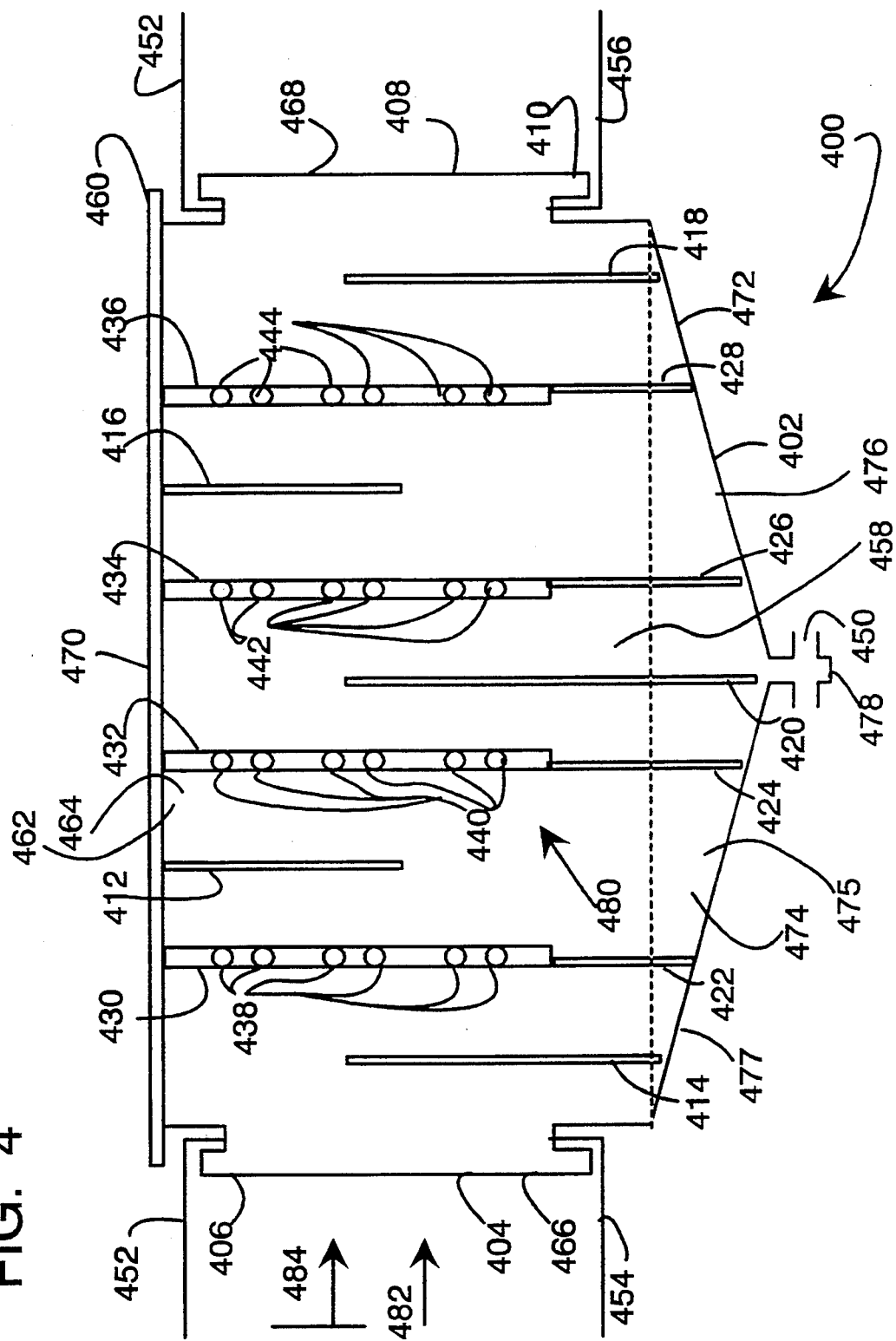
FIGS. 4 and 5 respectively illustrate a side plan view and an end plan view of a second embodiment solvent fume exhaust scrubber.
Figure 5:
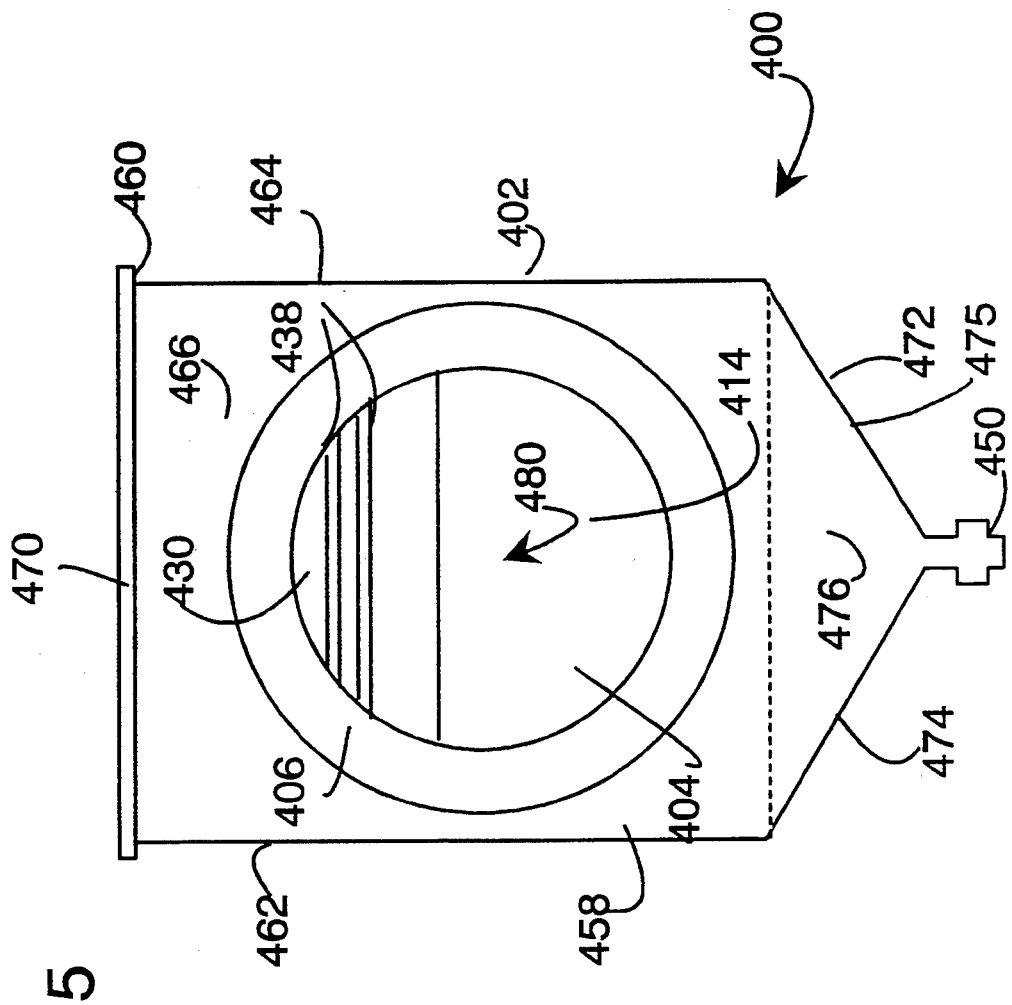

Referring to FIG. 4 and FIG. 5, there are shown respective side and end views of a solvent fume exhaust scrubber 400 in which a stainless steel housing 402 intersects an exhaust duct 452 carrying vapors from a photoresist stripper (not shown). The side surfaces 462 and 464, end surfaces 466 and 468 and top surface 470 of the housing 402 form a rectangular box 458 in which the top surface 470 includes a lid 460. The bottom surface 472 of the housing 402 includes four mutually adjoining triangular sections 474, 475, 476 and 477. Triangular sections 474 and 475 adjoin the bottom edges of the side surfaces 462 and 464, respectively, and triangular sections 476 and 477 adjoin the bottom edges of the end surfaces 466 and 468, respectively, and extend downward to a central point 478 at which a drain valve 450 is attached. The housing 402 encloses a throttling chamber 480 which has a cross-sectional area that is larger than the cross-sectional area of the exhaust duct 452. The housing 402 is secured to the inflow exhaust duct 454 by a circular inlet aperture flange 406 that receives an exhaust stream 482 of gases through a circular inlet aperture 404 in the housing 402. The exhaust stream 482 flows in a flow direction 484 from the inflow exhaust duct 454 through the throttling chamber 480 to the outflow exhaust duct 456 through a circular outlet aperture 408. The housing 402 is secured to the outflow exhaust duct 456 by a circular outlet aperture flange 410.

Within the throttling chamber 480, the exhaust stream 482 flows through a series of baffles and condensers in a sequence from the inflow exhaust duct 454 to the outflow exhaust duct 456 including a lower inlet baffle 414, a condenser 430, an upper inlet baffle 412, a condenser 432, a lower central baffle 420, a condenser 434, an upper outlet baffle 416, a condenser 436 and a lower outlet baffle 418. The baffles and condensers are planar and essentially rectangular in shape, having a planar surface disposed at right angles to the flow direction 484. Each baffle is inserted into a channel (not shown) which secures the baffle inside the housing 402 against motion parallel to the flow direction 484. The condensers 430, 432, 434 and 436 are respectively supported by condenser support baffles 422, 424, 426 and 428. The condenser support baffles 422, 424, 426 and 428 inserted into channels (not shown) at the lower portion of the housing 402 and the respective condensers 430, 432, 434 and 436 are inserted into the channels above the baffles to secure the condenser support baffles and condensers against motion parallel to the flow direction 484. The planar surface of the lower inlet baffle 414, the lower outlet baffle 418 and the lower central baffle 420 extends completely across the throttling chamber 480 horizontally from side surface 462 to side surface 464 but extends in the vertical direction from the bottom surface 472 of the chamber 480 only partially to the top surface 470. The planar surface of the upper inlet baffle 412 and the upper outlet baffle 416 extends completely across the throttling chamber 480 horizontally from side surface 462 to side surface 464 but extends in the vertical direction from the top surface 470 of the chamber only partially to the bottom surface 472. In this manner, the lower baffles 414, 420 and 418 are offset from the upper baffles 412 and 416 in the vertical direction so that substantially the entire cross-section of the exhaust stream 482 is deflected by the baffles. For example, the lower baffles 414, 418 and 420 may have sizes chosen so that only the lower half of the exhaust stream 482 is deflected and the upper baffles 412 and 416 may have a size chosen so that only the upper half of the exhaust stream 482 is deflected.

The baffles 412, 414, 416, 418, 420, 422, 424, 426 and 428 are carbon bead baffles such as the baffle 300 shown in FIG. 3. A lid 460 forms the top surface 470 of the housing 402. The baffles 412, 414, 416, 418, 420, 422, 424, 426 and 428 and the condensers 430, 432, 434 and 436 are removable from the chambers by lifting the lid 460.

Tubular cooling coils 438, 440, 442 and 444 are respectively interwoven through condensers 430, 432, 434 and 436. Each cooling coil extends substantially across the condensers in a series of parallel horizontal sections which are connected by C-shaped joints.

The throttling chamber 480 acts as a condensation chamber to recover organic vapor from the exhaust gases produced by chemical treatment equipment used to manufacture semiconductors and integrated circuits. The throttling chamber 480 within the housing 402 has a cross-sectional area that is larger than the area of the exhaust duct 452 feeding the solvent fume exhaust scrubber 400 so that the pressure of the fluid is reduced as it passes from a smaller area to a larger one, thus condensing the liquid vapor. The baffles 412, 414, 416, 418, 420, 422, 424, 426 and 428 deflect the movement of the exhaust stream flow 484 to cause a further pressure drop that intensifies condensation of the vapor. The condensers 430, 432, 434 and 436 further condensation of the vapor by supplying a surface upon which the condensate collects. The cooling coils 438, 440, 442 and 444 interwoven through the respective condensers 430, 432, 434 and 436 cool the exhaust vapor to supply an additional condensation of organic material from the exhaust vapor.

Figure 6:
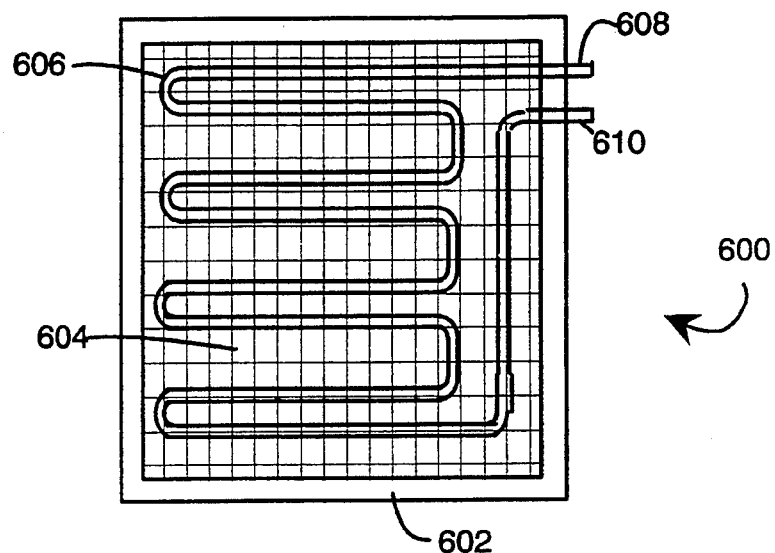
FIG. 6 depicts an end plan view of a condenser within the solvent fume exhaust scrubber shown in FIGS. 4 and 5.

Referring to FIG. 6, there is shown an end plan view of a condenser 600 which corresponds to each of the condensers 430, 432, 434 and 436 that are shown in FIGS. 4 and 5. The condenser 600 is planar and rectangular in shape, having the planar surface disposed perpendicular to the flow direction 484. The condenser 600 includes a condenser frame 602 for supporting a wire screen 604 and a cooling coil 606 interwoven through the condenser 600 and extending substantially across the condenser in a series of parallel horizontal sections which are connected by C-shaped joints. The cooling coil 606 corresponds to the cooling coils 438, 440, 442 and 444 shown in FIGS. 4 and 5. The condenser frame 602 is constructed from four stainless steel 1.5" U-channels joined at welded miter joints. The wire screen 604 is constructed from a ¼"×¼" stainless steel wire mesh which is extended and welded to engage the condenser frame 602. The cooling coil 606 engages and substantially traverses the planar surface of the condenser 600. The cooling coil has an inflow connector 608 for receiving the cooling fluid and an outflow connector 610 for discharging the cooling fluid. The cooling coils 438, 440, 442 and 444 are connected in series.

While the invention is described with reference to a particular embodiment, it is understood that this embodiment is merely illustrative of the concepts of the invention and that the scope of the invention is not so limited. Many variations, modifications, additions and improvements of the described embodiment are possible that fall within the scope of the invention, as defined in the appended claims.

I claim:

1. A method of removing solvent from an exhaust vapor stream in an exhaust duct, comprising the steps of:

infusing the exhaust vapor stream into a throttling chamber having a cross-sectional area that is larger than the cross-sectional area of the exhaust duct so that the pressure of the exhaust vapor is reduced and vapor condensate forms;

baffling the exhaust vapor stream within the throttling chamber to further reduce the exhaust vapor pressure and further form vapor condensate using a plurality of baffles enclosed within the throttling chamber, each baffle having a substantially planar surface disposed transverse to the flow direction and extending partially across the exhaust stream, the baffles being arranged in a longitudinal sequence in the flow direction and having substantially offsetting planar surfaces across the exhaust stream so that the plurality of baffles in combination extend substantially across the exhaust stream;

absorbing the exhaust vapor on a plurality of carbon beads;

condensing the exhaust vapor stream using a condenser enclosed within the throttling chamber and having a substantially planar surface disposed transverse to the flow direction; and cooling the exhaust vapor stream to further promote vapor condensate formation using a cooling coil engaging and substantially traversing the planar surface of the condenser.

2. A method as in claim 1 wherein the exhaust vapor is adsorbed on the carbon beads that are enclosed within a baffle frame of a baffle of the plurality of baffles.

3. A method as in claim 1, wherein the solvent removed from the exhaust vapor stream is photoresist stripping chemicals.

4. A method as in claim 1, wherein the exhaust vapor stream is condensed using a plurality of condensers arranged in a longitudinal sequence within the throttling chamber, each condenser having a substantially planar surface disposed transverse to the flow direction and each condenser having a cooling coil engaging and substantially traversing the planar surface of the condenser.

5. A method of removing solvent from an exhaust vapor stream in an exhaust duct, comprising the steps of:

infusing the exhaust vapor stream into a throttling chamber having a cross-sectional area that is larger than the cross-sectional area of the exhaust duct so that the pressure of the exhaust vapor is reduced and vapor forms condensate;

baffling the exhaust vapor stream within the throttling chamber using a plurality of baffles, each baffle having a substantially planar surface disposed transverse to the flow direction and extending partially across the exhaust stream, the baffles being arranged in a longitudinal sequence in the flow direction and having substantially offsetting planar surfaces so that the plurality of baffles in combination extend substantially across the exhaust stream, the plurality of baffles including a plurality of stainless steel baffles and a baffle having an internal cavity containing a plurality of carbon beads;

adsorbing the exhaust vapor stream on the plurality of carbon beads;

condensing the exhaust vapor stream using a condenser enclosed within the throttling chamber and having a substantially planar surface disposed transverse to the flow direction; and cooling the exhaust vapor stream to further promote vapor condensate formation using a cooling coil engaging and substantially traversing the planar surface of the condenser.

6. An apparatus for removing solvent fumes from an exhaust stream flowing through an exhaust duct, the duct formed by an inlet exhaust line section and an outlet exhaust line section, the apparatus comprising:

a throttling chamber interposed between the inlet and outlet exhaust line sections and having an inlet aperture in fluid communication with the inlet exhaust line section and having an outlet aperture in fluid communication with the outlet exhaust line section so that the exhaust stream flows in a flow direction from the inlet exhaust line section to the outlet exhaust line section, the throttling chamber having a transverse cross-sectional area greater than the transverse cross-sectional area of the exhaust duct;

a first baffle contained within the throttling chamber and having a planar surface disposed transverse to the flow direction and extending partially across the exhaust stream;

a second baffle including a baffle frame enclosing a plurality of carbon beads, the second baffle being contained within the throttling chamber and having a planar surface disposed transverse to the flow direction and extending partially across the exhaust stream, the second baffle transversely offsetting the first baffle so that the combination of baffles extends substantially across the exhaust stream;

a condenser contained within the throttling chamber and having a substantially planar surface disposed transverse to the flow direction; and a cooling coil engaging and substantially traversing the planar surface of the condenser.

7. An apparatus as in claim 6, further comprising:

a plurality of baffles arranged in a longitudinal sequence within the throttling chamber, each baffle having a substantially planar surface disposed transverse to the flow direction and extending partially across the exhaust stream.

8. An apparatus as in claim 7, further comprising:

a plurality of condensers arranged in a longitudinal sequence within the throttling chamber, each condenser having a substantially planar surface disposed transverse to the flow direction and each condenser having a cooling coil engaging and substantially traversing the planar surface of the condenser.

9. An apparatus as in claim 6, further comprising:

a plurality of condensers arranged in a longitudinal sequence within the throttling chamber, each condenser having a substantially planar surface disposed transverse to the flow direction and each condenser having a cooling coil engaging and substantially traversing the planar surface of the condenser.

10. An apparatus as in claim 6, wherein the first baffle is constructed from stainless steel.

11. An apparatus as in claim 6, wherein the throttling chamber, the first baffle, the baffle frame of the second baffle and the condenser are constructed from stainless steel.

12. An apparatus as in claim 6 wherein:

the throttling chamber includes a bottom surface having an inclined contour sloping to a low point; and wherein a drain is joined to the chamber proximal to the low point.

13. An apparatus as in claim 6, wherein side, end and top surfaces of the throttling chamber substantially form a rectangular box and a bottom surface of the housing includes four mutually adjoining triangular sections extending from the bottom edge of the sides and ends of the rectangular box down to a central point at which a drain valve is attached.

14. An apparatus as in claim 6, wherein the top surface of the throttling chamber is a removable lid and the condenser and baffles are removable from the throttling chamber upon removal of the lid.

15. An apparatus as in claim 6, wherein the carbon beads have a diameter in the range from 1 mm to 25 mm.

16. An apparatus as in claim 6, wherein the carbon beads have a diameter in the range from 4 mm to 6 mm.

17. An apparatus as in claim 6, wherein the solvent removed from the exhaust vapor stream is photoresist stripping chemicals.

* * * * *